(No Model.)
I. LEHMER & W. A. THOMAS.
MOLE TRAP.
No. 560,806. Patented May 26, 1896.
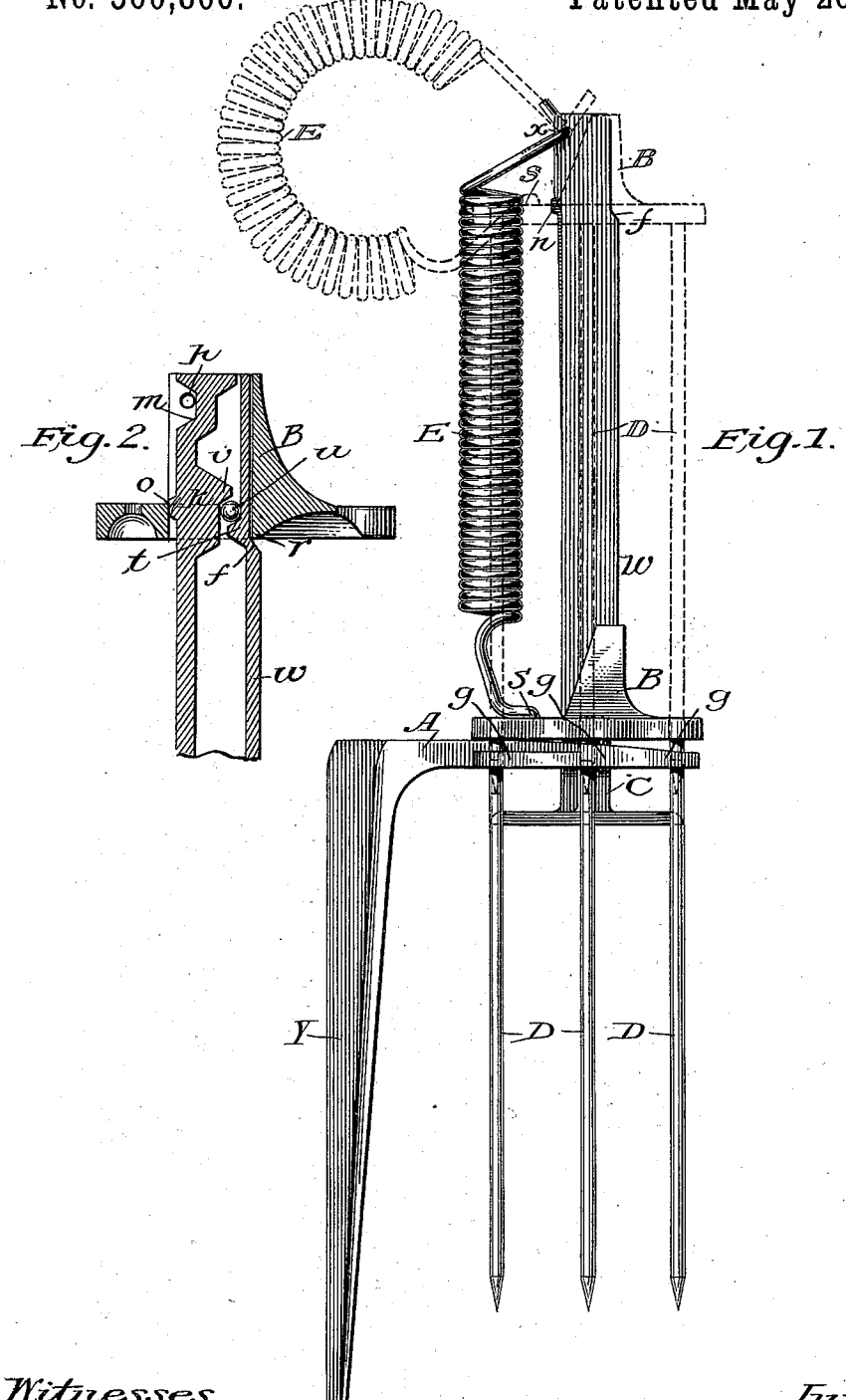
Witnesses.
James H. McLauchlin
John W. McLauchlin
Inventors.
Isaac Lehmer
Wilfred A. Thomas

UNITED STATES PATENT OFFICE.

ISAAC LEHMER AND WILFRED A. THOMAS, OF FAWN RIVER, MICHIGAN.

MOLE-TRAP.

SPECIFICATION forming part of Letters Patent No. 560,806, dated May 26, 1896.

Application filed August 20, 1894. Serial No. 520,850. (No model.)

*To all whom it may concern:*

Be it known that we, ISAAC LEHMER and WILFRED A. THOMAS, citizens of the United States, residing at Fawn River, St. Joseph county, in the State of Michigan, have invented a new and useful Improvement in Mole-Traps, of which the following is a specification.

Our invention relates to improvements in mole-traps, more particularly to that class of mole-traps having impaling prongs or spears in which the tines are attached to a head or plate which is guided on a suitable standard and actuated by a spring or weight with a suitable trip mechanism for springing the trap.

The objects of our invention are, first, to provide a special construction of spring for such traps which will maintain a substantially uniform pressure on the prong-head throughout its stroke and that will admit of a closer compression of parts and so secure the compact construction; second, to provide a simple, reliable, and convenient setting and releasing device for the trap; third, to simplify the construction of a mole-trap generally; fourth, to provide a mole-trap which can be constructed substantially from rough castings without the necessity of machine-work upon the same. We accomplish these objects of our invention by the device and mechanism shown in the accompanying drawings, in which—

Figure 1 is a side view of a mole-trap embodying all the features of our invention; and Fig. 2 is a sectional side view of the top of the standard, the trip, the antifriction-roller, and the prong-head when raised to the top of the standard.

Similar letters of reference refer to similar parts throughout both views.

Referring to the lettered parts of the drawings, A represents the standard which supports the remaining parts of the trap.

B is the prong-head, which bears the prongs or tines D D.

C is the trip, and E is the spring for actuating the prong-head.

The trap is held in position by the side of a mole-track by inserting the lower bayonet-shaped portion Y of the standard A into the ground by the side of the run. Extending upwardly from the standard is its part $w$, which serves as a guide for the prong-head for the trip and as a support for one end of the spring E. At the top of the portion $w$ is a beveled shoulder $f$ to support the prong-head B when the trap is set. To each side of the standard are projecting parts $g$, containing suitable guide-holes for the tines D. The trip C is supported by a suitable upwardly-projecting bar, which is guided in a suitable guideway in the side of the upright portion $w$, and is retained in place by being embraced by the prong-head B and by the end of the spring E passing through holes $h$ in the standard A and through the depression or notch M in the upper end of the bar from the trap C. The spring E is a free coiled spring adapted to fold on itself, the ends of the wire of which are attached to the prong-head B at S and to the upper end of the standard $w$, and is adapted to fold upon itself when the prong-head is raised up, as indicated by the dotted lines in Fig. 1. When the prong-head B is raised up, the prongs or tines D are of sufficient length to still project through the guide-holes in the parts $g$ a little distance to insure their being properly guided to place. This also serves to assist in retaining the prong-head B in its proper position at the top of the upright portion $w$. At the top of the upright portion $w$, opposite the beveled shoulder $f$, is a beveled projection $n$ on the opposite side corresponding thereto. Between the upright portion of the trip C and the main body of the upright portion $w$ is a roller $u$, which is retained in place by a stop $l$ on the portion W of the standard and stop $v$ on the trip C. It serves to relieve friction between the upright portion of the trip C and the portion $w$ of the standard A. On the outer side of the upright portion of the trip C is a projecting boss $k$, situated at a point opposite the beveled shoulder $f$ when the trip C is down and adapted to pass above the beveled portion $n$ when the trip C is raised.

To set and operate our improved trap, the bayonet portion Y is inserted into the ground by the side of the mole-run, the tines are forced into the ground, and the trap sprung two or three times to insure an unobstructed passage for the tines D. Then the prong-head B is raised to the top of the standard, and as it is passed up it is carried to one side by the beveled portion n, which carries the lower edge r of the prong-head B against the beveled shoulder f, and the trip being forced down passes the boss k under the upper edge o of the prong-head to the opposite side from shoulder f and so retains it in that position. The mole in passing through the run will slightly raise the trip C, which will carry the lug k on the trip up past the upper edge o of the prong-head B, when the prong-head will pass down over the sloping shoulder f and drive the prongs into the ground from the force of spring E and so entrap the mole.

Having thus described our improved mole-trap, we desire to state that it is capable of considerable variation without departing from our invention. The spring E, as we have constructed and used it, is adapted for use in almost any trap of this kind. Our improved retaining and releasing device for the prong-head is also adapted for use in the mole-traps which are operated by weights or other springs than the spring we have here shown. We desire to state that by a very careful construction of hardened parts to relieve friction the antifriction roll or ball u might be dispensed with; but it is of very great advantage in relieving friction, and the construction would not be nearly so practical without it. It would require a great deal of unnecessary time and labor to make the parts so perfect that the antifriction-roll could be dispensed with.

Having thus described our invention, what we claim as new, and desire to secure by Letters Patent, is—

1. In a mole-trap, the combination of the main standard portion A consisting of the bayonet portion Y for insertion into the ground, the vertical portion w to serve as a guide to the prong-head and having bevels f and n toward the top thereof, and projecting portions g situated on top of the ground and containing suitable perforations; prong-head B embracing the upright portion w of said standard and adapted to be guided thereby with prong D D therein extending through the apertures in the projecting portions g; the trip C with the upright portion projecting upwardly in a suitable guide in the upright portion w of the standard A and through the center of the prong-head B retained in place at its upper end by the end x of the spring E; boss k at the outer side of the upright portion of said trip C adapted to project beyond the upright portion w at a point beneath the beveled portion n and opposite the beveled shoulder f; a roller u between said upright portion of the trip and the portion w; and the free coiled spring adapted to fold upon itself and engage at its upper end at the upper end of the portion w at h and at its lower end to the prong-head B at S, all coacting together substantially as described for the purpose specified.

2. In a mole-trap the combination of the main standard portion with suitable bayonet portion projecting therefrom for supporting the trap and having a vertical portion w projecting upwardly therefrom; a suitable prong-head perforated to reciprocate along the portion w as a guide, perforations in projections on the base to guide prongs on said head; a trip C with an upright portion and a free coiled spring secured at its upper end to the upper end of the upright portion w and its lower end to the prong-head B; and the trip C between the prongs D for releasing said trap coacting together substantially as described.

3. In a mole-trap a standard portion with a beveled shoulder at the top and with beveled portion opposite thereto; a trip C with a vertical portion extending upwardly through a suitable guide in said standard bearing a boss adapted to project beyond the standard portion below the bevel; a roller u between said upright portion of the trip and the standard portion retained in place by suitable stops on the standard and upright portion; a prong-head adapted to reciprocate on said standard and be retained on the beveled shoulder and boss on the upright portion of the trip engaging the same; and suitable means of forcing the prongs or tines downward when the trap is released as specified.

4. In a mole-trap the standard portion, a beveled shoulder toward the top thereof and the oppositely-beveled portion to the opposite side which forms an offset in the standard, the prong-head adapted to reciprocate on said standard; the trip C with a vertical portion extending upwardly in a suitable guide in said standard bearing a boss projecting outwardly beyond the line of the standard portion below the offset and even with the standard portion above the offset to retain the prong-head on the beveled shoulder, and suitable means of forcing the prong-head down when the trap is sprung as specified.

ISAAC LEHMER.
WILFRED A. THOMAS.

Witnesses:
D. S. BUCK,
MARY C. McLAUCHLIN.